(12) United States Patent
Troy et al.

(10) Patent No.: US 9,062,931 B2
(45) Date of Patent: Jun. 23, 2015

(54) IRON SIGHT CENTERED WINDAGE WHEEL

(71) Applicants: Stephen P. Troy, Lee, MA (US); Sergey A. Monveldt, South Hadley, MA (US)

(72) Inventors: Stephen P. Troy, Lee, MA (US); Sergey A. Monveldt, South Hadley, MA (US)

(73) Assignee: Troy Industries, Inc., West Springfield, MA (US)

( * ) Notice: Subject to any disclaimer, the term of this patent is extended or adjusted under 35 U.S.C. 154(b) by 0 days.

(21) Appl. No.: 14/505,386

(22) Filed: Oct. 2, 2014

(65) Prior Publication Data

US 2015/0128471 A1     May 14, 2015

Related U.S. Application Data

(60) Provisional application No. 61/886,214, filed on Oct. 3, 2013.

(51) Int. Cl.
| | |
|---|---|
| *F41G 1/00* | (2006.01) |
| *F41G 1/16* | (2006.01) |
| *G02B 23/16* | (2006.01) |
| *G02B 23/20* | (2006.01) |
| *F41G 1/38* | (2006.01) |

(52) U.S. Cl.
CPC *F41G 1/16* (2013.01); *G02B 23/16* (2013.01); *G02B 23/20* (2013.01)

(58) Field of Classification Search
CPC ........... F41G 11/003; F41G 1/10; F41G 3/08; F41G 1/033; F41G 11/004; F41G 1/16; F41G 1/44; F41G 1/18; F41G 3/005; F41G 11/007; F41G 1/17; F41G 1/425; F41G 3/00; F41G 1/08; F41G 3/02; F41G 1/42; F41G 1/02; F41G 1/06; G02B 15/06
USPC ............................ 42/124–128, 135–148, 111
See application file for complete search history.

(56) References Cited

U.S. PATENT DOCUMENTS

| | | | | |
|---|---|---|---|---|
| 5,533,292 | A * | 7/1996 | Swan | 42/123 |
| 6,779,290 | B1 * | 8/2004 | Houtsma | 42/148 |
| 7,181,882 | B2 * | 2/2007 | Woodbury | 42/137 |
| 7,356,962 | B2 * | 4/2008 | Swan | 42/147 |
| 7,946,074 | B2 * | 5/2011 | Nemec | 42/137 |

* cited by examiner

*Primary Examiner* — Troy Chambers
*Assistant Examiner* — Bridget Cochran
(74) *Attorney, Agent, or Firm* — Robert A. Parsons; Michael W. Goltry; Parsons & Goltry

(57) ABSTRACT

A firearm sight including a base coupled to a firearm receiver. The base includes a body having opposed side defining a void therebetween. A sight housing having an end coupled to the base and an opposing end carrying a sight structure. The end coupled to the base is bifurcated with spaced apart furcated portions defining a central gap therebetween. A threaded support member extends transversely between the opposed side portions and concurrently through apertures formed through the furcated portions. A wheel member has a threaded bore and is received on the threaded support member between the furcated portions within the central gap. Rotation of the wheel member moves the sight housing laterally between the opposed sides of the base.

12 Claims, 5 Drawing Sheets

IRON SIGHT CENTERED WINDAGE WHEEL

CROSS-REFERENCE TO RELATED APPLICATION

This application claims the benefit of U.S. Provisional Application No. 61/886,214, filed 3 Oct. 2013.

FIELD OF THE INVENTION

This invention relates to firearm accessories.

More particularly, the present invention relates to sights for firearms.

BACKGROUND OF THE INVENTION

In the field of firearms, sights are numerous and varied but are used for a single purpose. A sight system is intended to put a bullet on a target. Sight systems include, in a basic form, a rear sight and a front sight. Lining up the front sight with the rear sight is intended to determine the striking position of the bullet. However, there are added factors complicating this simple process. The distance the bullet must travel will cause a deviation from the designated target. In other words, a front and rear sight can be adjusted to deliver bullet on target at a specific distance. Problems arise when wind and other environmental factors enter the picture. When a wind blows across the trajectory of a projectile, the path of the projectile is altered to a lesser or greater extent, depending on the force applied. This will cause the projectile to strike to the left or right of the target if not accounted for. Many shooters simply alter their aim to the side of the target to account for the bullet wind drift. This deviation can alternatively be accounted for by adjusting the front or rear sight relative the other. Additionally, alignment of the front and rear sight may be off to the left or right as well. This will also cause a bullet to strike off the mark. In this case, use of a windage adjustment is simply to zero the sights, and environmental factors such as wind are accounted for by the shooter altering their aiming point. However, adjustable sights require additional elements that make the sight assembly wider and have knobs and adjustment mechanisms on the sides which can be disturbed or inadvertently contacted to distort the proper aiming point.

It would be highly advantageous, therefore, to remedy the foregoing and other deficiencies inherent in the prior art by providing a sight having a centered windage wheel.

SUMMARY OF THE INVENTION

Briefly, to achieve the desired objects and advantages of the instant invention provided is a sight for use on a projectile device. The sight includes a base couplable to the projectile device. The base includes a body having a first side portion and a second side portion spaced apart from and parallel to the first side portion to define a void therebetween. A sight housing has an end coupled to the base and an opposing end. The end of the sight structure is positioned within the void between the first side portion and the second side portion. The end of the sight structure is bifurcated with spaced apart first and second furcated portions defining a central gap therebetween. A threaded support member extends transversely between the first side portion and the second side portion, through the void therebetween and concurrently through apertures formed transversely through the first furcated portion and the second furcated portion. A wheel member has opposed ends and a threaded bore extending laterally therethrough between the opposed ends. The wheel member is threadably received on the threaded support member between the first and second furcated portions within the central gap. The opposed ends of the wheel member abut adjacent ones of the first and second furcated portions. A sight structure is carried by the opposing end of the sight housing.

Additionally, the base can include a cross-piece extending between the first side portion and the second side portion at forward edges thereof to further define the void. The apertures formed transversely through the first furcated portion and the second furcated portion are smooth walled to permit lateral motion of the sight housing along the threaded support member between the first side portion and the second side portion.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Figure 1:
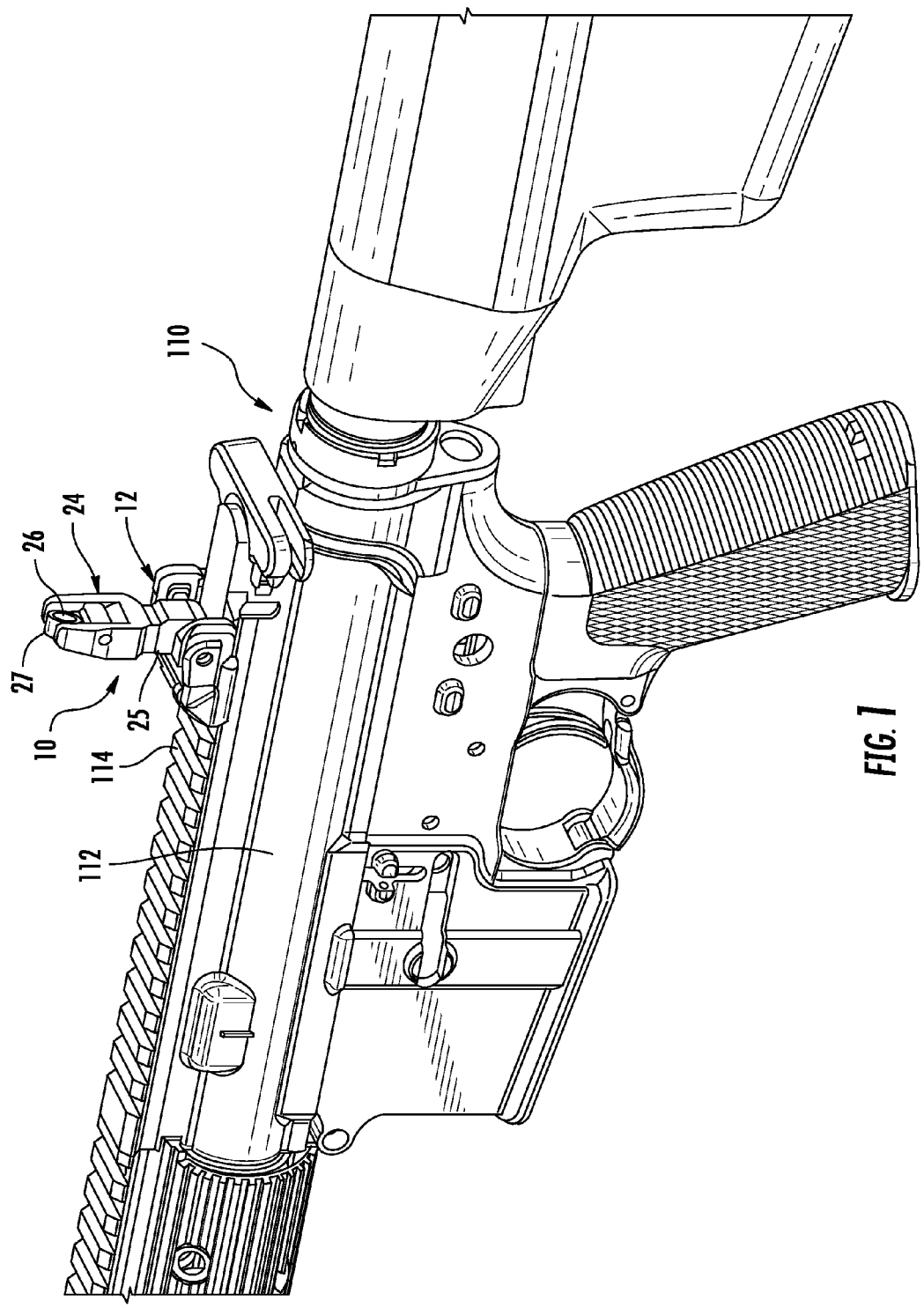
FIG. 1 is a partial perspective view of a firearm carrying a back-up iron sight having a centered windage wheel according to the present invention.
Figure 2:
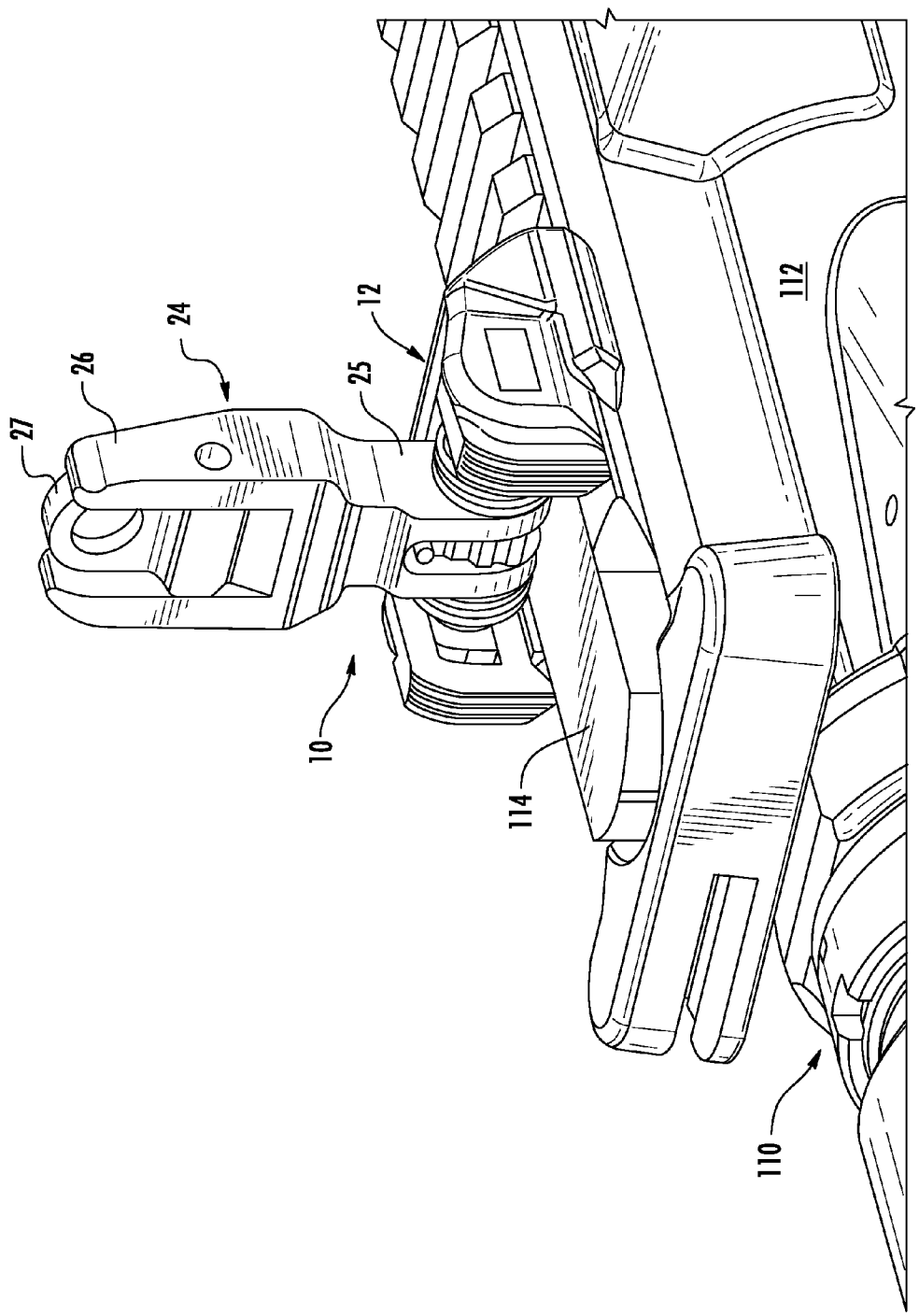
FIG. 2 is an enlarged perspective view of the back-up iron sight having a centered windage wheel of FIG. 1.

Turning now to the drawings in which like reference characters indicate corresponding elements throughout the several views, attention is directed to FIGS. 1 and 2 which illustrate a back-up iron sight generally designated 10 carried by a firearm 110. Back-up iron sight 10 is coupled to firearm 110 at or proximate a receiver 112 thereof. Iron sight 10 is carried rearward of and used in combination with a front sight (not shown). While the term "iron sight" is employed, it will be understood that sight 10 can be formed of substantially ay metal, plastic, or other rigid material and the like. Additionally, while sight 10 is preferably used on firearms, it can be used on substantially any projectile device, such as cross bows and the like, that requires manual sighting. Sight 10, in the present embodiment includes an attachment base 12 configured to be received by and secured to a rail 114 of firearm 110. One of ordinary skill in the art will understand that rail 114 can be attached to receiver 112 as a separate element, or formed as an integral part of receiver 112 of firearm 110. One of ordinary skill will also understand that rail 114 can be a part of or attached to a handguard carried by the firearm. It will also be understood that base 12 can be a fixed or integral part of a handguard, rail, receiver and the like, employed on the firearm.

Figure 3:
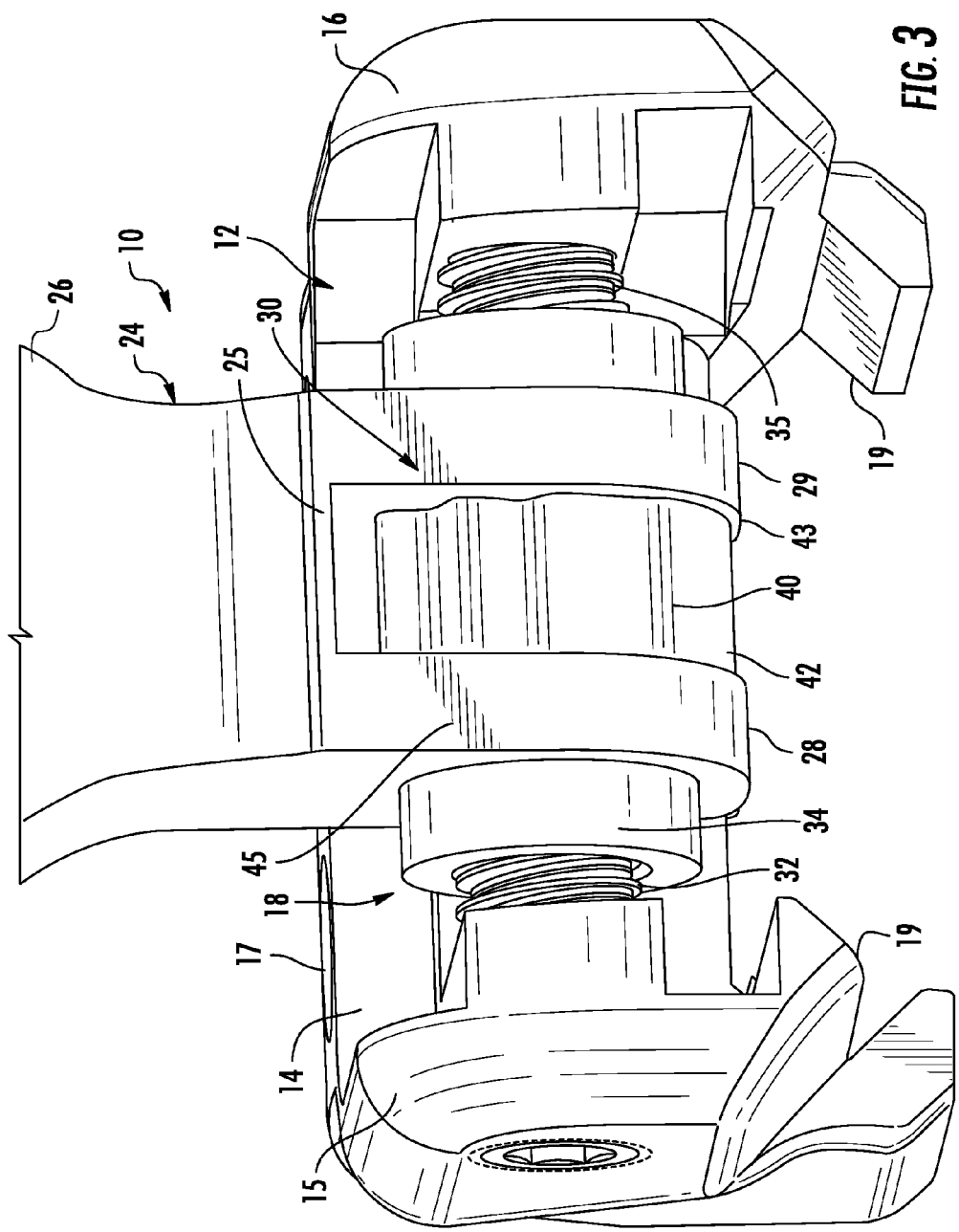
FIG. 3 is a front perspective view of the back-up iron sight having a centered windage wheel according to the present invention.
Figure 4:
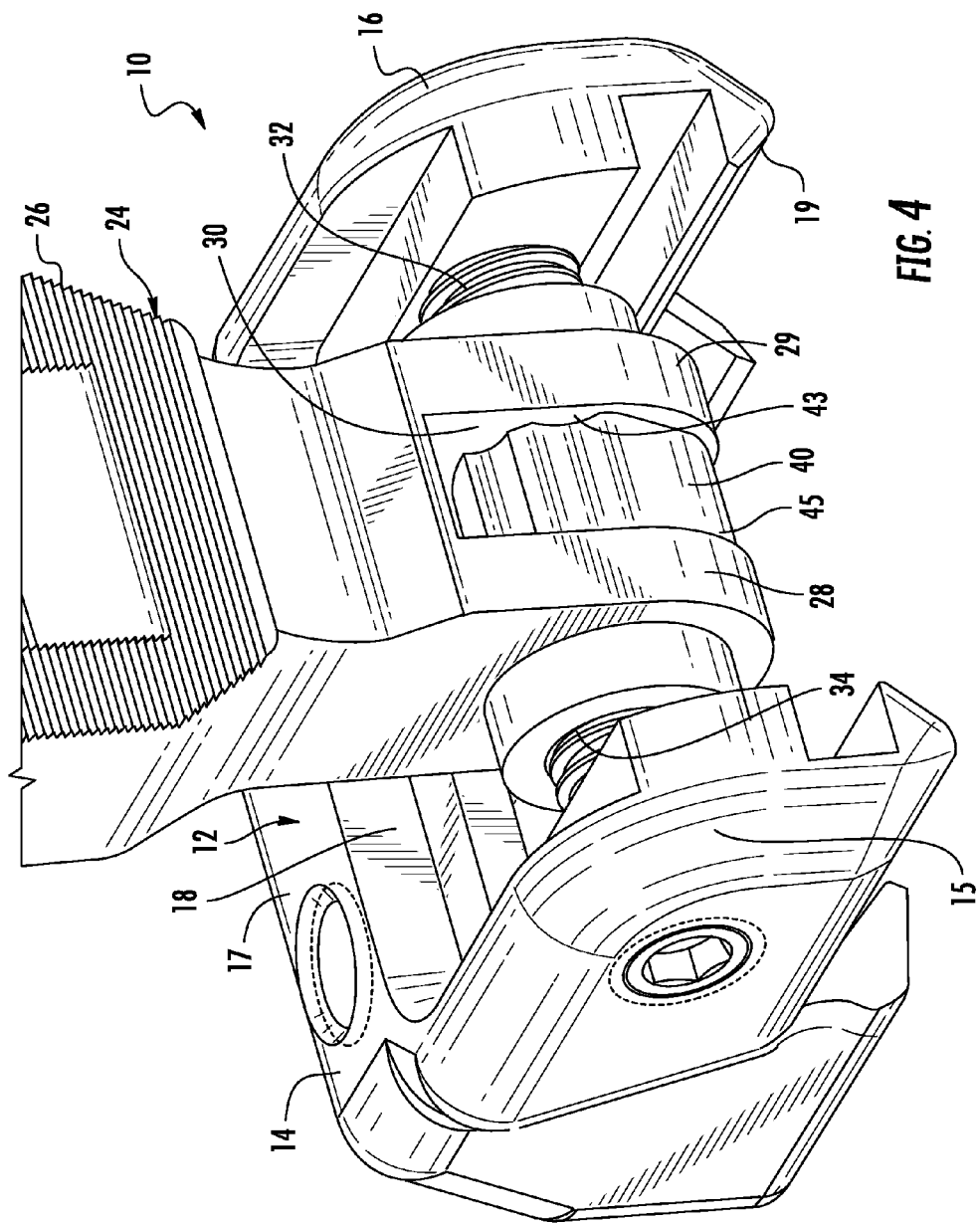
FIG. 4 is a right side quarter perspective view of the back-up iron sight of FIG. 3.
Figure 5:
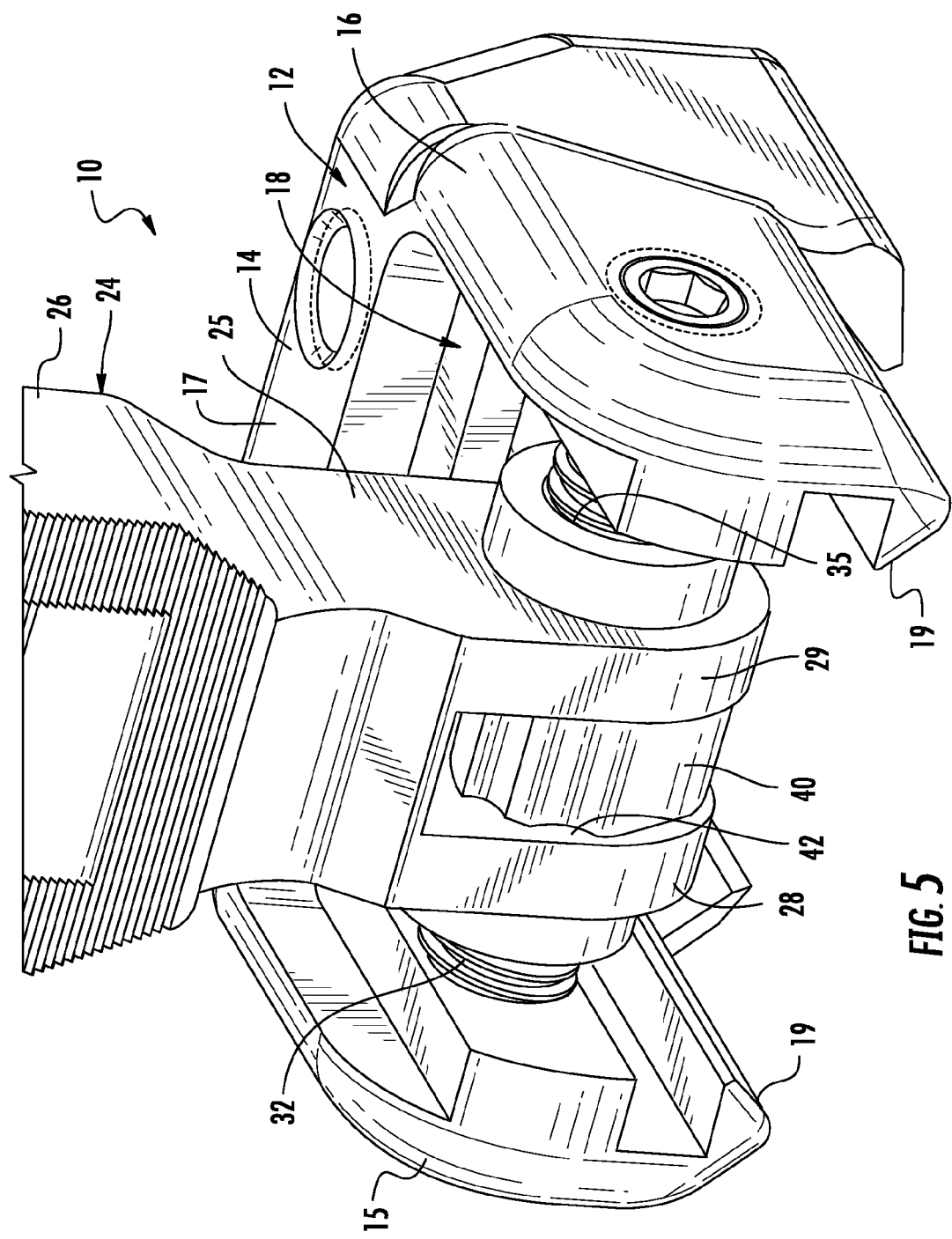
FIG. 5 is a left side quarter perspective view of the back-up iron sight of FIG. 3.

With additional reference to FIGS. 3-5, in the present embodiment, base 12 includes a body 14 having side portions 15 and 16 held by a cross-piece 17 at forward edges thereof to define a void 18. The bottoms of side portions 15 and 16 carry mounting fixtures 19 such as used to mount accessories to rails and the like.

A pivoting sight housing 24 includes an end 25 pivotally coupled to base 12 and an opposing end 26. Sight housing 24 is moveable between an upright position (illustrated) in which sight 10 is configured for use, and a lowered position for storage wherein sight housing 24 overlies and is parallel to rail 114. Opposing end 26 includes a sighting structure 27 such as a notch or aperture element within which to align the front sight post or other sight structure. End 25 is bifurcated with spaced apart furcated portions 28 and 29 defining a central gap 30 therebetween. End 25 is positioned in void 18 between side portions 15 and 16. When sight housing 24 is in the upright position, furcated portions 28 and 29 extend upwardly from between side portions 15 and 16. A threaded support member 32 extends transversely between side portions 15 and 16, through void 18 and concurrently through apertures 34 and 35 formed transversely through furcated portions 28 and 29, respectively. Threaded support member 32 is fixedly positioned to prevent relative motion to side portions 15 and 16. Apertures 34 and 35 are smooth walled to permit lateral motion of sight housing 24 along threaded support member 32 between side portions 15 and 16. In this manner, sight housing 24 can be positioned against side portion 15, against side portion 16, or any position intermediate side portions 15 and 16.

To adjust and fix the position of sight housing 24, a wheel member 40 is carried by threaded support member 32 between furcated portions 28 and 29 within central gap 30. Wheel member 40 is cylindrical having opposed ends 42 and 43, and a bore 45 extending laterally therethrough between opposed ends 42 and 43. Bore 45 is threaded so as to be threadably received on threaded support member 32. Thus, wheel member 40 is carried by threaded support member 32 within central gap 30, with end 42 abutting furcated portion 28 and end 43 abutting furcated portion 29. Wheel member 40 securely holds sight housing 24 in a fixed position on support member 32, preventing lateral movement thereof. To adjust sight housing 24, wheel member 40 is rotated forwardly or rearwardly to move wheel member 40 on threaded support member 32 toward side portion 15 or toward side portion 16. In changing the position of wheel member 40, the position of sight housing 24 is moved and secured in a corresponding location. The central positioning of wheel member 40 prevents accidental access by an individual's fingers, and also prevents inadvertent adjustments. The outer surface of wheel member 40 is formed with grooves and lands to permit using an item such as a bullet tip to access and turn wheel member 40. In this manner, sight 10 can be adjusted for proper windage, but prevented from unintentional adjustment. It is particularly useful for zeroing the sights and assuring that they remain zeroed.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A sight for use on a projectile device, the sight comprising:
    a base couplable to the projectile device, the base includes a body having a first side portion and a second side portion spaced apart from and parallel to the first side portion to define a void therebetween;
    a sight housing having an end coupled to the base and an opposing end, the end of the sight housing is positioned within the void between the first side portion and the second side portion, the end of the sight housing being bifurcated with spaced apart first and second furcated portions defining a central gap therebetween;
    a threaded support member extending transversely between the first side portion and the second side portion, through the void therebetween and concurrently through apertures formed transversely through the first furcated portion and the second furcated portion;
    a wheel member having opposed ends and a threaded bore extending laterally therethrough between the opposed ends, the wheel member threadably received on the threaded support member between the first and second furcated portions within the central gap, with the opposed ends of the wheel member adjacently abutting the first and second furcated portions; wherein the wheel member is rotatable to move longitudinally on the threaded support member; and
    a sight structure carried by the opposing end of the sight housing.

2. A sight as claimed in claim 1 wherein the end of the sight housing is pivotally coupled to the base and moveable between an upright position for use, and a lowered position for storage.

3. A sight as claimed in claim 1 wherein the base includes a cross-piece extending between the first side portion and the second side portion at forward edges thereof to further define the void.

4. A sight as claimed in claim 1 wherein the first side portion and the second side portion each carry a mounting fixture for mounting the base to the projectile device.

5. A sight as claimed in claim 1 wherein the apertures formed transversely through the first furcated portion and the second furcated portion are smooth walled to permit lateral motion of the sight housing along the threaded support member between the first side portion and the second side portion.

6. A firearm sight comprising:
    a firearm having a receiver;
    a base coupled to the firearm receiver, the base including a body having a first side portion and a second side portion spaced apart from and parallel to the first side portion to define a void therebetween;
    a sight housing having an end coupled to the base and an opposing end, the end of the sight housing is positioned within the void between the first side portion and the second side portion, the end of the sight housing being bifurcated with spaced apart first and second furcated portions defining a central gap therebetween;
    a threaded support member extending transversely between the first side portion and the second side portion, through the void therebetween and concurrently through apertures formed transversely through the first furcated portion and the second furcated portion;
    a wheel member having opposed ends and a threaded bore extending laterally therethrough between the opposed ends, the wheel member threadably received on the threaded support member between the first and second furcated portions within the central gap, with the opposed ends of the wheel member adjacently abutting the first and second furcated portions; wherein the wheel member is rotatable to move longitudinally on the threaded support member.

7. A firearm sight as claimed in claim 6 wherein the end of the sight housing is pivotally coupled to the base and moveable between an upright position for use, and a lowered position for storage.

8. A firearm sight as claimed in claim 6 wherein the base includes a cross-piece extending between the first side portion and the second side portion at forward edges thereof to further define the void.

9. A sight as claimed in claim 6 wherein the apertures formed transversely through the first furcated portion and the second furcated portion are smooth walled to permit lateral motion of the sight housing along the threaded support member between the first side portion and the second side portion.

10. A sight as claimed in claim 6 wherein the first side portion and the second side portion each carry a mounting fixture for mounting the base to the firearm.

11. A sight as claimed in claim 10 wherein the firearm receiver includes a rail and the mounting fixtures for mounting the base to the firearm are rail mounting fixtures.

12. A sight as claimed in claim 10 wherein the base is integrally formed with the firearm.

\* \* \* \* \*